Aug. 7, 1956  W. W. SNYDER  2,757,994
PISTON WEAR AND PACKING ADAPTOR RING
Filed Sept. 3, 1953
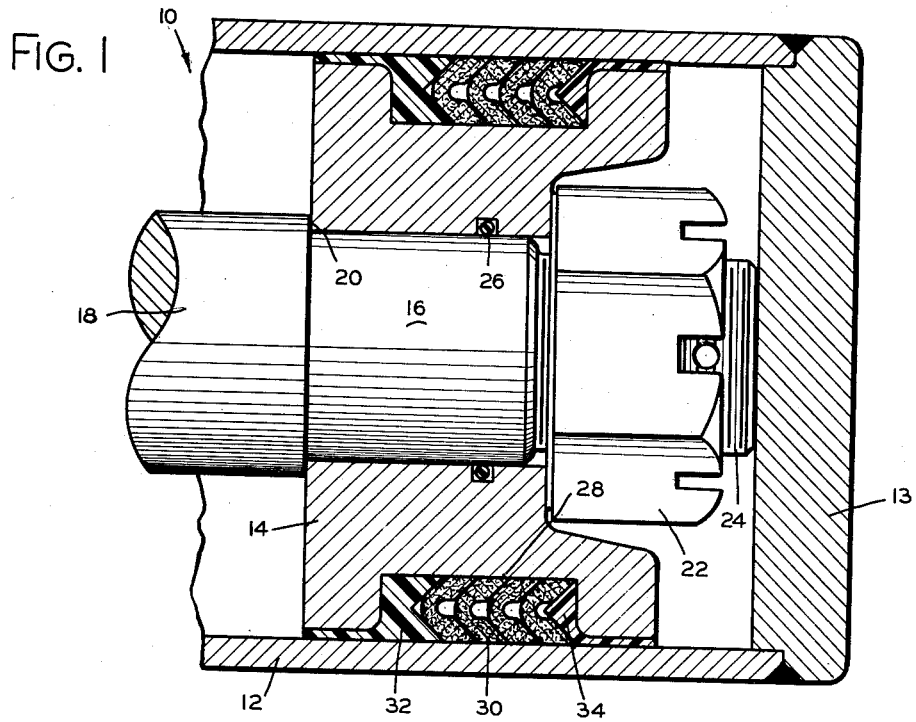
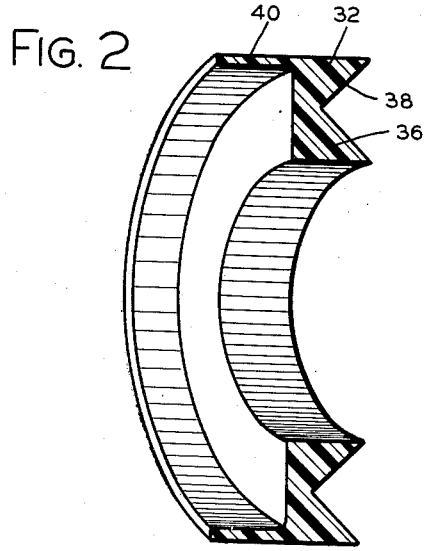
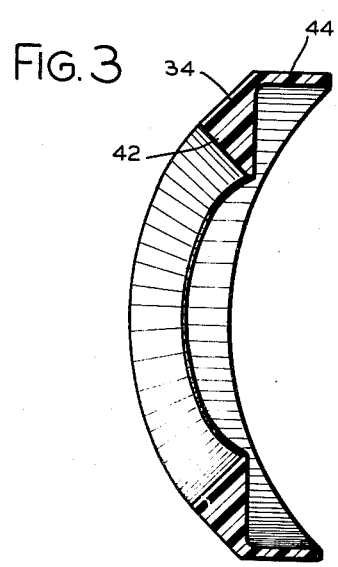
INVENTOR.
WILLIAM W. SNYDER
BY
Kenneth C. Witt
ATTY.

United States Patent Office 2,757,994
Patented Aug. 7, 1956

2,757,994

PISTON WEAR AND PACKING ADAPTOR RING

William W. Snyder, Benton Harbor, Mich., assignor to Clark Equipment Company, a corporation of Michigan Application September 3, 1953, Serial No. 378,297

5 Claims. (Cl. 309—23)

My present invention relates generally to sealing means, and, more specifically, is concerned with combined piston wear and packing adaptor rings for use with sealing means embodied, for example, in hydraulic piston and cylinder assemblies.

Heretofore, in the manufacture of hydraulic piston and cylinder assemblies, the pistons have been fabricated from cast iron and coated with brass to provide a suitable wear surface which bears against the cylinder wall. Not only is brass itself costly but also the process of applying it to cast iron. Furthermore, once the brass becomes damaged or worn, the entire piston must be replaced, which results in considerable expense.

Also, in known assemblies, an annular channel is generally formed in the outer periphery of the piston and arranged therein are a plurality of chevron-type packing rings formed of a material such as leather. So that the packing rings are displaced radially outwardly for providing a fluid-tight seal with the cylinder wall, packing adaptor rings are disposed at either end of the piston channel.

It is an object of my present invention to provide combined piston wear and packing adaptor rings preferably for use with chevron-type packing rings employed, for example, in hydraulic piston and cylinder assemblies.

In the use of my present invention, a pair of combined piston wear and packing adaptor rings are provided for each piston. Each adaptor ring comprises an annular body portion disposed at either end of the piston channel for displacing the packing rings radially outwardly. One of the adaptor rings has an annular recess of triangular cross section formed in one side of the body portion for receiving one of the end chevron-type packing rings, while the other of the adaptor rings has a body portion of trianular cross section which interfits with the other end chevron-type packing ring.

In addition, each adaptor ring, at the outer periphery of the body portion, has an integral, relatively thin, annular sleeve projecting axially away from the piston channel, which sleeve is disposed between the outer periphery of the piston and the inner periphery of the cylinder. The outer peripheries of the sleeves provide wear surfaces which bear against the cylinder wall.

The combined piston wear and packing adaptor rings of my present invention may be easily assembled with a piston and, also, may be easily and inexpensively replaced, should they become damaged or worn, without replacement of the entire piston assembly.

The adaptor rings of my present invention are preferably fabricated of molded nylon; this material being tough, strong, light in weight, and chemical and abrasion resistant.

Now, in order to acquaint those skilled in the art with the manner of constructing and using the combined piston wear and packing adaptor rings of my present invention, I shall describe in connection with the accompanying drawing, a preferred embodiment of my invention.

In the drawing:

Figure 1 is a sectional view of a portion of a hydraulic piston and cylinder assembly in which my present invention is embodied;

Figure 2 is a partial perspective view, with portions being shown in section, of one of the combined piston wear and packing adaptor rings of my present invention; and Figure 3 is a partial perspective view, with portions being shown in section, of a combined piston wear and packing adaptor ring which is complementary to the ring shown in Figure 2.

Referring now to the drawing, there is indicated generally by the reference numeral 10, a hydraulic assembly which comprises a cylinder 12, closed at one end by a plate 13, and a piston 14 mounted in the cylinder for reciprocal movement. The piston 14 is mounted on an intermediate reduced portion 16 of a piston rod 18 and is held against the shoulder 20 of the piston rod 18 by means of a nut 22, threaded on the reduced end portion 24. Preferably, an elastic ring 26 is arranged about the intermediate reduced portion 16 of the piston rod within an annular groove formed in the piston 14. The ring 26 serves as a substantially fluid-tight seal between the piston 14 and piston rod 18.

The outer diameter of the piston 14 is less than the inner diameter of the cylinder 12, and, in its outer periphery, has formed an annular channel 28. Arranged within the channel 28 are chevron-type packing rings 30 which may, for example, be formed of leather material of generally V-shaped cross section.

In order to maintain the outer peripheries of the packing rings 30 in firm fluid-tight contact with the inner periphery of the cylinder 12, I provide combination piston wear and packing adaptor rings 32 and 34.

The ring 32 comprises a body portion 36 (see Fig. 2), which seats within the piston channel 28, at the left end thereof as viewed in Figure 1, and has formed therein an axially facing annular recess 38 of triangular cross section. The ring 32 is further provided, at its outer periphery, with a relatively thin, integral, annular axial extension or sleeve 40 which is disposed between the outer periphery of the piston 14 and the inner periphery of the cylinder 12; the ring 32 thus serving as a piston wear ring with the outer periphery of the body portion and sleeve providing a bearing surface.

The ring 34 (see Fig. 3) consists of a body portion 42, which seats within the piston channel 28, at the right end thereof as viewed in Figure 1. The body portion 42, which projects axially and is of triangular cross section, has at its outer periphery, an integral annular, relatively thin axial extension or sleeve 44 which is disposed between the outer periphery of the piston 14 and the inner periphery of the cylinder 12; the ring 34 thus serving, like the ring 32, as a piston wear ring with the outer periphery of the sleeve providing a bearing surface.

During assembly of the rings 30, 32 and 34 within the piston channel 28, the packing rings 30 are compressed axially and spread or displaced radially outwardly. When the piston 14 is assembled within the cylinder 12 the radial displacement of the rings 30 causes the latter to be disposed into firm, fluid-tight contact with the inner wall of the cylinder 12.

The combined piston wear and packing adaptor rings 32 and 34 are preferably fabricated of molded nylon. Molded nylon is tough, strong, light in weight, and chemical and abrasion resistant. It will be understood, however, that equivalent materials other than nylon may be used if desired.

It will be readily apparent to those skilled in the art that the combined piston wear and packing adaptor rings of my present invention may, in the first instance, be easily assembled with a piston, and, thereafter, easily and inexpensively replaced, should they become damaged or worn, without replacement of the entire piston assembly.

It will be understood also that the construction of my invention may be assembled in a suitable annular channel in the cylinder instead of a channel in the piston if desired; that is, the packing rings and the combined packing adaptor and wear rings can be installed in the cylinder and bear on the piston instead of vice versa.

Moreover, it is possible in some cases to omit one of the combined packing adaptor and wear rings and employ a single packing adaptor and wear ring in conjunction with the packing rings.

Now, while I have shown and described what I believe to be a preferred embodiment of my present invention, it will be understood that various rearrangements and modifications may be made therein without departing from the principles of my invention.

I claim:

1. For use with a cylinder and a piston therein having an annular channel formed in the outer periphery thereof, the combination of packing rings arranged within the piston channel and engaging the inner periphery of the cylinder for providing a fluid-tight seal thereat, a pair of combined piston wear and packing adaptor rings each comprising an annular body portion disposed at either end of the piston channel for displacing the packing rings radially outwardly, and each adaptor ring having an annular sleeve projecting axially away from the piston channel and disposed between the outer periphery of the piston and the inner periphery of the cylinder.

2. For use with a cylinder and a piston therein having an annular channel formed in the outer periphery thereof, the combination of packing rings arranged within the piston channel and engaging the inner periphery of the cylinder for providing a fluid-tight seal thereat, a pair of combined piston wear and packing adaptor rings each comprising an annular body portion disposed at either end of the piston channel for displacing the packing rings radially outwardly, and each adaptor ring at the outer periphery of the body portion having an integral, relatively thin, annular sleeve projecting axially away from the piston channel and disposed between the outer periphery of the piston and the inner periphery of the cylinder with the outer peripheries of the sleeves providing bearing surfaces.

3. For use with a cylinder and a piston therein having an annular channel formed in the outer periphery thereof, the combination of a plurality of chevron-type packing rings of V-shaped cross section arranged within the piston channel and engaging the inner periphery of the cylinder for providing a fluid-tight seal thereat, a pair of combined piston wear and packing adaptor rings each comprising an annular body portion disposed at either end of the piston channel for displacing the packing rings radially outwardly, one of said adaptor rings having an annular recess of triangular cross section formed in one side of the body portion for receiving one of the end chevron-type packing rings, the other of said adaptor rings having a body portion of triangular cross section which interfits with the other end chevron-type packing ring, and each adaptor ring at the outer periphery of the body portion having an integral, relatively thin, annular sleeve projecting axially away from the piston channel and disposed between the outer periphery of the piston and the inner periphery of the cylinder with the outer peripheries of the sleeves providing bearing surfaces.

4. For use with a cylinder member and a piston member therein, the combination of an annular channel formed in one of the members, packing rings arranged within the said channel and engaging the surface of the other member for providing a fluid-tight seal between the two members, a pair of combined packing adaptor and wear rings each comprising an annular body portion disposed at either end of the said channel for displacing the packing rings radially, and each adaptor ring having an annular sleeve projecting axially away from the channel and disposed between the surfaces of the piston and the cylinder.

5. For use with a cylinder member and a piston member therein, the combination of an annular channel formed in one of the members, at least one packing ring arranged within the said channel and engaging the surface of the other member for providing a fluid-tight seal between the two members, a combined wear and packing adaptor ring comprising an annular body portion disposed at one end of the said channel for forcing the packing ring radially against the other member, and the said adapter ring having an annular sleeve projecting axially away from the said channel and disposed between the surfaces of the piston and the cylinder.

References Cited in the file of this patent

UNITED STATES PATENTS

| | | |
|---|---|---|
| 1,595,305 | Kibele | Aug. 10, 1926 |
| 2,188,957 | Pfauser | Feb. 6, 1940 |
| 2,515,956 | Greenberg | July 18, 1950 |

FOREIGN PATENTS

| | | |
|---|---|---|
| 477,462 | Canada | Oct. 2, 1951 |